United States Patent
Appleby et al.

(10) Patent No.: US 7,176,827 B2
(45) Date of Patent: Feb. 13, 2007

(54) APPARATUS FOR REDIRECTING RADIATION

(75) Inventors: Roger Appleby, Malvern (GB); Rupert Nicholas Anderton, Malvern (GB); Peter Russell Coward, Malvern (GB); Alan Harold Lettington, Whiteknights (GB)

(73) Assignee: Qinetiq Limited (GB)

( * ) Notice: Subject to any disclaimer, the term of this patent is extended or adjusted under 35 U.S.C. 154(b) by 62 days.

(21) Appl. No.: 10/513,810

(22) PCT Filed: May 6, 2003

(86) PCT No.: PCT/GB03/01963

§ 371 (c)(1),
(2), (4) Date: Nov. 8, 2004

(87) PCT Pub. No.: WO03/098323

PCT Pub. Date: Nov. 27, 2003

(65) Prior Publication Data

US 2005/0168388 A1    Aug. 4, 2005

(30) Foreign Application Priority Data

May 17, 2002    (GB)    ................................ 0211353.8

(51) Int. Cl.
*G01S 13/00*    (2006.01)
(52) U.S. Cl. .......................... 342/22; 343/756
(58) Field of Classification Search ................ 343/756, 343/909, 904, 700 MS; 342/22, 179
See application file for complete search history.

(56) References Cited

U.S. PATENT DOCUMENTS

| | | | |
|---|---|---|---|
| 3,754,271 A | 8/1973 | Epis | 343/756 |
| 5,596,336 A * | 1/1997 | Liu | 343/756 |
| 5,748,369 A | 5/1998 | Yokota | 359/487 |
| 6,937,182 B2 * | 8/2005 | Lovberg et al. | 342/22 |

FOREIGN PATENT DOCUMENTS

| | | |
|---|---|---|
| EP | 0 389 240 | 9/1990 |
| WO | WO 98/47020 | 10/1998 |
| WO | WO 99/61942 | 12/1999 |
| WO | WO 01/37029 | 5/2001 |
| WO | WO 02/084796 | 10/2002 |

* cited by examiner

*Primary Examiner*—Hoang V. Nguyen
*Assistant Examiner*—Ephrem Alemu
(74) *Attorney, Agent, or Firm*—McDonnell Boehnen Hulbert & Berghoff LLP

(57) ABSTRACT

An apparatus for redirecting radiation including a polarization dependent reflector and an optical component able to transform the polarisation of radiation as it passes through the component. Radiation having a first polarisation component impinging upon the reflector from a source is reflected towards a scene area. Radiation not having this polarisation component passes through the reflector. The radiation having the first polarisation is then transmitted towards a scene via the optical component. As the radiation passes via the optical component, reflects back from the scene and passes again via the optical component, the polarisation is changed to state where it can now pass through the polarisation dependent reflector. The apparatus allows a scene to be illuminated as if the illuminator were positioned at the viewpoint of an imaging system, and so aids uniform illumination of the scene. The apparatus is particularly suited to mm-wave systems, wherein the reflector may comprise a parallel wire grid polarizer, and the optical component may comprise a quarter-wave plate.

12 Claims, 5 Drawing Sheets

APPARATUS FOR REDIRECTING RADIATION

Figure 1:
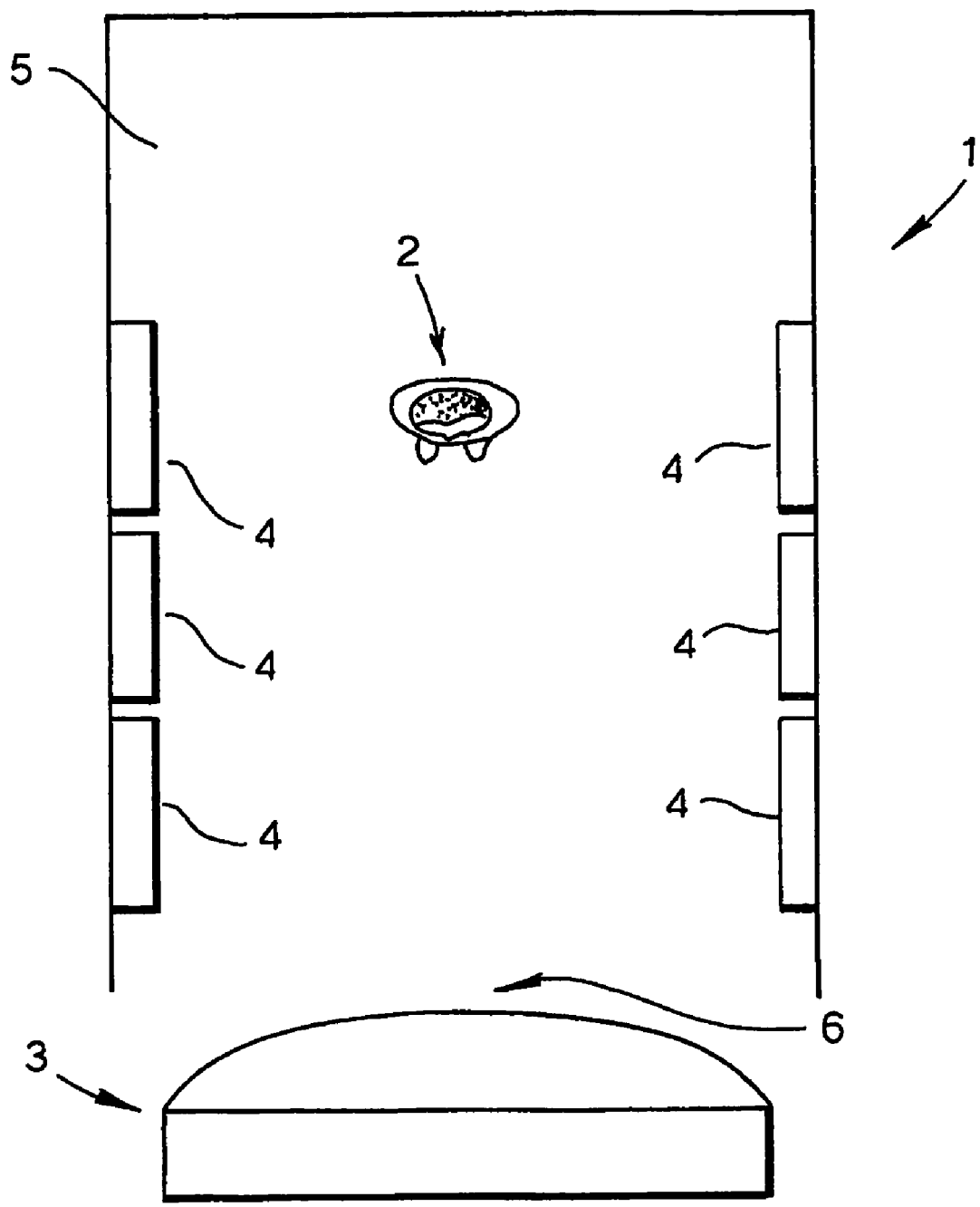

This application is a 371 of PCT/GB03/01963 filed May 6, 2003 which claims priority to United Kingdom patent application No. 021135,8 filed May 17, 2002.

This invention relates to an apparatus for redirecting radiation particularly suitable for electromagnetic imaging systems. In particular, the invention relates to a means for illuminating a subject from the direction of a receiver or imager, without obscuring the subject from the imager or receiver. The invention has particular utility at millimetre wavebands, but may also be used at other wavelengths.

When imaging a scene using a millimetre wave imaging system it is common, particularly when operated indoors, to use some sort of illumination source in combination with the imager to increase the contrast of the scene, and hence improve image quality. Ideally, this illumination would be delivered uniformly from all angles. In practice this has proven to be difficult, so systems often compromise by having banks of illuminators above, below, and at each side of the scene, that crudely approximate to a uniform illumination. One important problem that occurs with this method is that the scene cannot be illuminated from the viewpoint of the receiver—which is the position where an illuminator is most beneficial in terms of providing a satisfactorily illuminated scene. The illuminators themselves are typically quite large, as they need to ideally provide uniform illumination coverage, but are constrained by the limitations of the wavelength at which they work, so clearly, any attempt to place an illumination source at the position of the receiver would block out the view of the scene from the receiver itself.

Positioning a mirror to reflect the radiation towards the target along the boresight of the imager would also be unsatisfactory, as then the mirror would be in the path of the radiation returning from the target to the imager. A partially reflecting mirror could be used, but is not ideal as the radiation would be attenuated each time it was incident upon the mirror.

Patent application PCT/GB98/100985 contains details of a scanning apparatus of the type that may be used along with the current invention. This application discloses apparatus for providing to the receivers radiation that has been scanned from across the desired field of view by means of a rotating reflector element, and also features a folded optical path that incorporates the rotating reflector, making the system more compact. It does not however address the problem of satisfactory illumination of a target area before the radiation reaches this scanning mechanism.

According to the present invention there is provided an apparatus for redirecting radiation, wherein the apparatus is able to receive radiation along a first axis or plane and redirect its passage along a second axis or plane, and the apparatus comprises:

a polarisation dependent reflector, arranged to reflect radiation having a first polarisation state and pass radiation having a second polarisation state; and an optical component for altering the polarisation state of radiation passing therethrough adapted such that radiation in the first polarisation state passing through the optical component towards a scene, reflected therefrom and passing back through the optical component is transformed to the second polarisation state.

The polarisation dependent reflector may be planar, or may be curved so as to direct the radiation from an illuminator as desired to selected parts of the target. The polarisation dependent reflector will largely reflect components of radiation having a first polarisation, but will largely transmit components not having the first polarisation. The first polarisation is preferably a linear polarisation. Any radiation transmitted through the polarisation dependent reflector at this stage need not play any further role in illuminating the target.

The optical component through which the radiation passes from the reflector to the target preferably comprises a quarter wave plate. This will have the effect of transforming linearly polarised radiation incident upon it to circularly polarised radiation, either right handed (RH) or left handed (LH), according to the properties of the quarter wave plate and the reflector. Radiation that reflects from the target will have a "handedness" opposite to the radiation incident upon the target, so RH polarisation will go to LH and vice versa.

Some of the radiation reflected from the target will be directed towards the imager. When this radiation passes through the quarter wave plate for the second time it will modify the polarisation of the radiation such that it is linear and orthogonal to the radiation originally reflected by the reflector towards the target. Radiation having this modified state of polarisation will thus pass unimpeded through the polarisation dependent reflector plate on towards the imager.

Some imagers are only sensitive to one particular polarisation. In this case it is important to arrange the polarisation dependent reflector in the correct manner such that it passes radiation from the target that is of the same polarisation state as required by the imager.

For systems operating at millimetre wave frequencies, the quarter wave plate is preferably a meanderline. Meanderlines are known in the prior art. See, for example, U.S. Pat. No. 3,754,271. Systems operating at different frequencies may use alternative technologies when implementing the quarter wave plate.

The illumination source may be a solid state noise source. The output of the noise source may be amplified using standard means to produce the desired illumination levels. The noise source may be distributed, such that it comprises a plurality of separate noise sources in different locations. This may provide a more even illumination of the target.

Note that the term "optical" as used in this specification does not limit the application to visible optical wavelengths. The term merely implies that that to which it refers may be analysed using optical or quasi optical techniques. Further, note that an "optical component" as mentioned in this specification may comprise a simple optical component, or may comprise a compound component formed from a plurality of more simple optical components.

According to another aspect of the invention there is provided an illumination source arranged to redirect radiation along the boresight axis of an imaging system, comprising:

a source of radiation at a frequency compatible with the imaging system;

a polarisation dependent reflector, adapted to receive radiation from the illumination source, and arranged to reflect radiation having a first polarisation state and pass radiation having a second polarisation state; and an optical component for altering the polarisation state of radiation passing therethrough adapted such that radiation in the first polarisation state passing through the optical component towards a scene, reflected therefrom and passing back through the optical component is transformed to the second polarisation state.

The apparatus of the present invention may be integrated into a chamber, which may also contain additional sources of illumination and an imaging system.

According to a further aspect of the invention there is provided a method of changing the apparent source direction of radiation comprising the steps of:
a) receiving radiation from an illumination source and reflecting only radiation having a first polarisation state and passing radiation having a second polarisation state, by means of a polarisation dependent reflector;
b) processing the reflected radiation using an optical component, whereby the optical component changes the polarisation state of the radiation, and passing this processed radiation towards a target area;
c) passing at least some of the radiation reflected from the target area back towards the optical component; and
d) changing the polarisation of the radiation reflected from the target area to the second polarisation state such that it can pass through the polarisation dependent reflector.

According to a yet further aspect of the invention there is provided a method of illuminating a target area using an off-axis illumination source comprising the steps of:
a) providing an illuminator generating radiation at a desired wavelength
b) reflecting radiation from the illuminator having a first polarisation state and passing radiation having a second polarisation state, by means of a polarisation dependent reflector;
c) processing the reflected radiation using an optical component, whereby the optical component changes the polarisation state of the radiation, and passing this processed radiation towards a target area;
d) passing at least some of the radiation reflected from the target area back towards the optical component; and
e) changing the polarisation of the radiation reflected from the target area to the second polarisation state such that it can pass through the polarisation dependent reflector.

Figure 2:
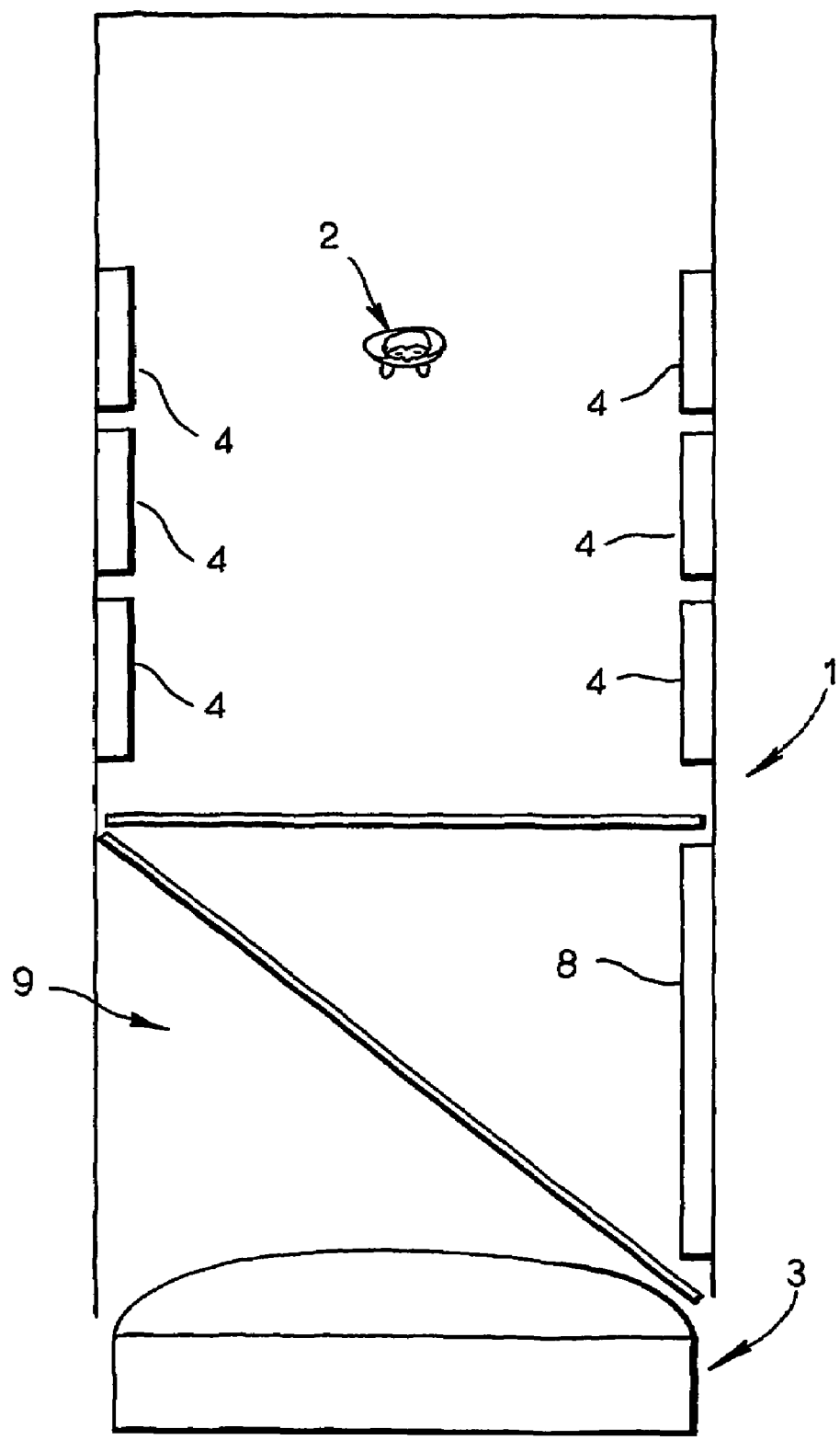
Figure 3:
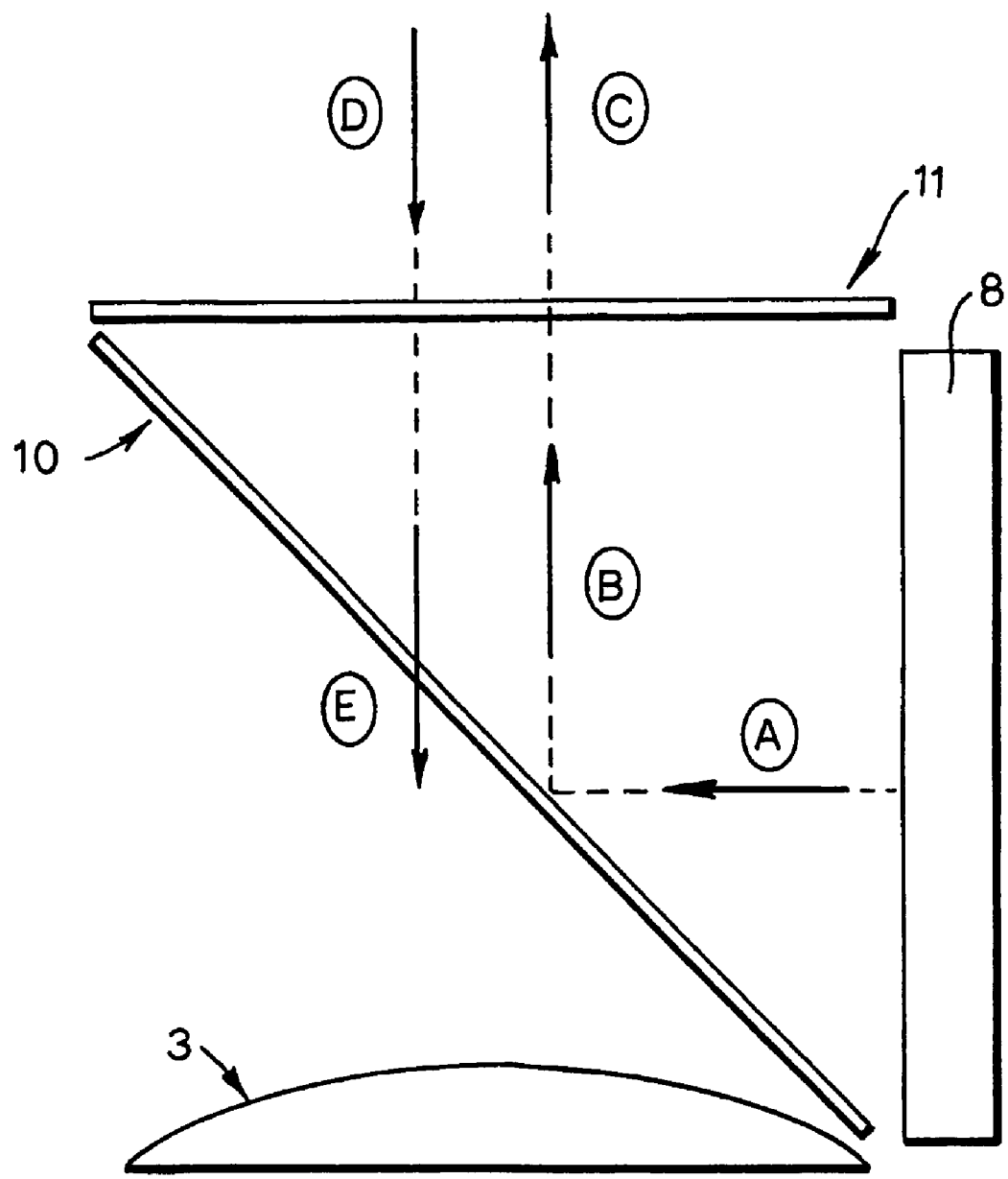
Figure 4:
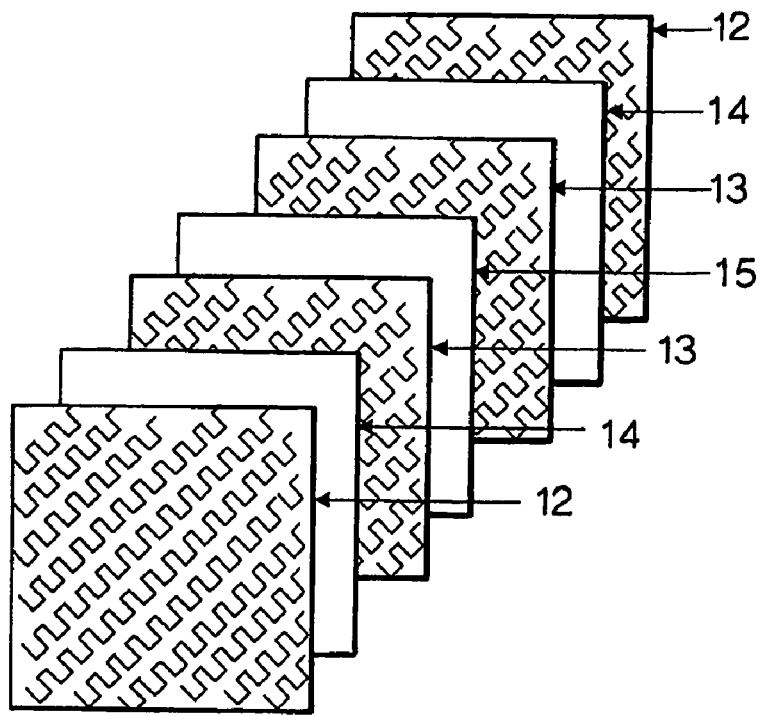

The invention will now be described in more detail, by way of example only, with reference to the following drawings, in which:

FIG. 1 diagrammatically illustrates a prior art chamber not incorporating the current invention;

FIG. 2 diagrammatically illustrates an embodiment of the current invention incorporated into a chamber having an imager and illumination sources;

FIG. 3 diagrammatically illustrates the polarisation states of the radiation as it passes through various stages of one embodiment of the invention; and FIG. 4 diagrammatically illustrates the detail of a meanderline used to transform polarisation states of millimetre wave energy.

Figure 5:
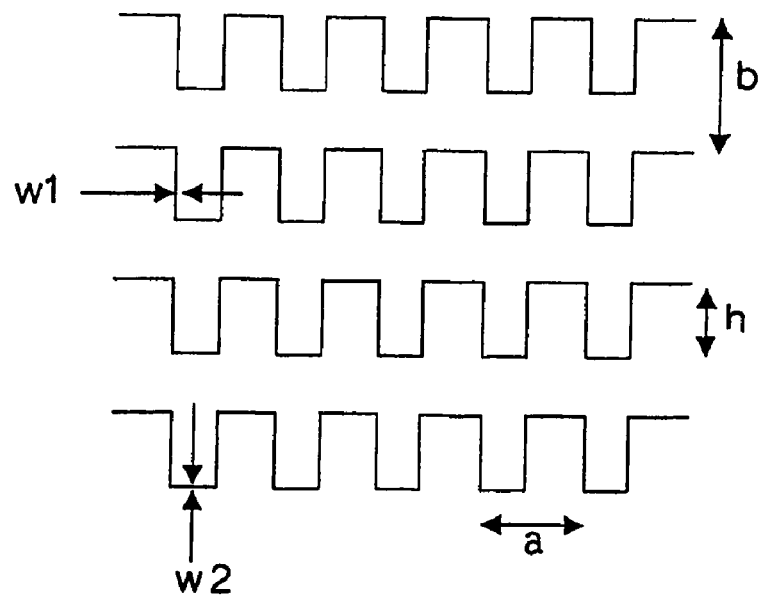

FIG. 5 diagrammatically illustrates the track pattern on a meanderline used in an embodiment of the present invention.

Figure 6:
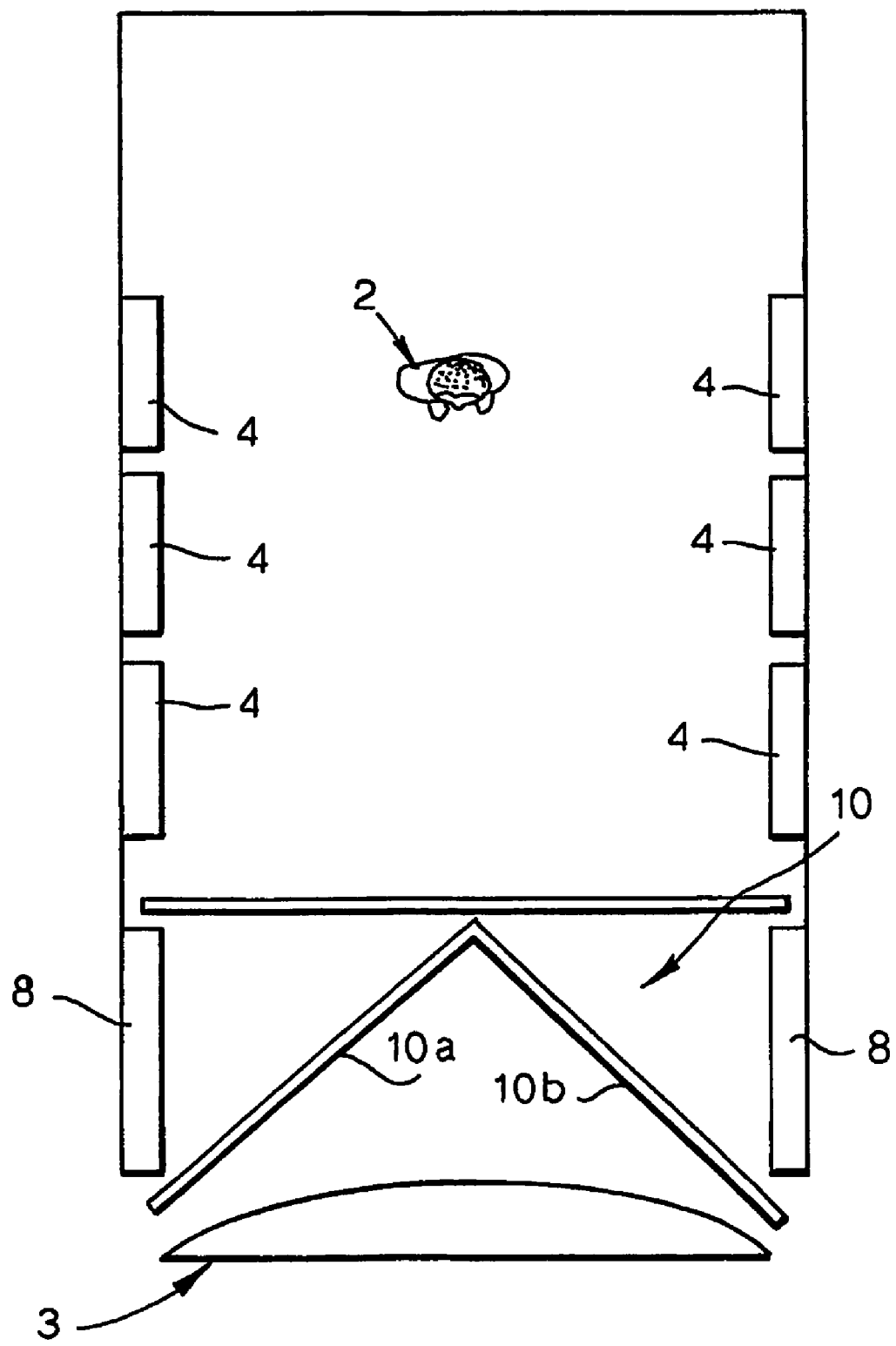

FIG. 6 diagrammatically illustrates a second embodiment of the current invention.

Shown in FIG. 1 is a plan view of an imaging chamber 1, as typically used when employing a millimetre wave imager 3 indoors to view a target 2. Arrays of illuminators 4 are positioned along the sides (and sometimes the top and floor also) of the chamber, to generate a contrast between the target 2 and the background 5 as seen by the imager 3.

The ideal chamber provides uniform illumination of the target 2 from all directions. This is particularly important in millimetre wave systems, due to the relatively long wavelength of the radiation when compared to visible frequencies leading to much more specular reflection of the radiation. This can lead to dark spots if the target happens to be reflecting an area that is not providing illumination. Illuminators 8 are shown that provide side-on illumination, and partial illumination from the front of the chamber. However, millimetre wave imagers may be quite large in frontal area, and so can take up a significant portion of the area 6 at the front of the chamber 1. This area 6 then not available to use as a source of illumination of the target 2.

Any elements of the target that are so positioned that they would otherwise reflect radiation from the area 6 back to the area 6 are hence not able to do so, and therefore these elements may not be optimally imaged by the imager 3. Surfaces that are parallel or almost parallel to the imager viewplane are particularly susceptible to this problem.

Shown in FIG. 2 is a chamber that incorporates an illumination reflector 9 according to the present invention. It will be seen that there are illuminators 4 positioned as in a prior art chamber, but there is a further illuminator 8 positioned towards the front of the chamber 1. By means of the invention, this illuminator 8 is able to illuminate the target as if the illuminator 8 were cosited with the imager 3, i.e. as if the illuminator 8 and the imager 3 occupied the same spatial position. This is because the illumination reflector 9 redirects the radiation from the illuminator 8 along the boresight of the imager towards the target, but provides minimal interference with the reflected illumination from the target back towards the imager 3.

Best shown in FIG. 3 is the detail of the illumination reflector 9 and how it is able to reflect radiation along the boresight of the imager 3, by modifying the polarisation of the illumination radiation, without blocking the target 2 (see FIG. 2) from the imager 3. An illumination source 8 provides unpolarised radiation, shown by the arrow A, which is directed generally towards the polarisation dependent reflector 10. This reflects all vertical polarisation components of the radiation, whilst allowing horizontal polarisation components to pass straight through. The vertical components are reflected towards the target, as shown by arrow B, by means of arranging the angle of the polarisation dependent reflector 10 relative to the imager 3 and target area 2 in a suitable fashion. Horizontally polarised components pass through the polarisation dependent reflector 10 and play no significant part in the illumination of the target. Before the vertically polarised radiation hits the target it passes through a quarter wave plate 11, which converts the vertical polarisation to RH circular polarisation, shown by the arrow C. As a result of the physical process of reflections of circular polarisation, the "handedness" of the polarisation swaps when the radiation reflects from an object. Therefore, reflections of this radiation from the target, shown by arrow D, get converted to LH circular polarisation.

The LH reflections that are directed back towards the quarter wave plate 11 have their polarisation state changed to horizontal polarisation by the action of the quarter wave plate. This polarisation, shown by arrow E, is able to pass unimpeded through the polarisation dependent reflector 10 to the front end optics of the imager 3. The imager 3 in this case is sensitive only to horizontal polarisation.

The polarisation dependent reflector plate 10 comprises of a grid of parallel conducting tracks printed onto a non conducting substrate. Components of the electric field that are in line with the grid axis will be reflected, whist components perpendicular to the grid will pass straight through. The width of each track of the grid is 180 µm, whilst the track pitch is 480 µm. Such a grid is suitable for operation at Ka band, but the grid should be adapted as appropriate for operation within different frequency bands. Design rules for producing a wire grid polariser for a particular operating frequency are well known in the art, and further details will not be provided herein.

The optical component that acts as a quarter wave plate used in the current embodiment comprises a meanderline polarisation twister. FIG. 4 shows the detail of the meanderline to be used in a Ka band embodiment of the current invention. Four substrates, each having a series of copper tracks arranged in a square-wave formation are sandwiched together, along with blank spacer boards that maintain the correct distance between each of the active layers. The two outer active layers 12 (Grid type A) are 20 thousandths of an inch (thou) thick, as are the inner two active layers 13 (Grid type B). The central spacer board 15 is 15 thou thick, whereas the other spacers 14 are 20 thou thick. The material used for the substrates and spacer boards is Arlon AD270, available from Holders Technology UK Ltd, Tweedbank Industrial Estate, Galashiels, Scotland, TD1 3RS.

FIG. 5, along with Table 1 show the detail of the tracks that make up each of the panels of the meanderline, with the detailed dimensions of the various elements of the tracks in table 1, where w1 and w2 are linewidths, b is the periodicity, h is the height, and a is the pitch.

TABLE 1

| Grid type | Track dimensions, millimeters | | | | |
|---|---|---|---|---|---|
| | a | b | h | w1 | w2 |
| A | 0.79 | 3.75 | 1.02 | 0.16 | 0.11 |
| B | 1.17 | 3.75 | 1.59 | 0.29 | 0.38 |

Necessary modifications to the design of the meanderline to account for different operating frequencies will be known to those skilled in the relevant arts, and will not be discussed further herein. Further details relating to meanderlines may be found in the following references: L. Young et al., *IEEE Transactions on Antennas and Propagation*, vol AP21, pp 376–378, May 1973, and R A Chu et al, *IEEE Transactions on Antennas and Propagation*, vol AP35, pp 652–661, June 1987. Details of some other devices that may be used in place of a meanderline for the optical component 11 are provided in *The International Journal of Infrared and Millimeter Waves*, Vol 2, No 3, 1981.

FIG. 6 shows a second embodiment of the current invention, wherein the polarisation dependent reflector 10 has been divided into two independent sections 10a, 10b, each arranged to reflect towards the target radiation coming from two different directions. This arrangement means that the length of the reflector 10 along the axis of the imager boresight is half as much as with the embodiment shown in FIG. 2, thus leading to a more compact illumination arrangement. Of course, however, two illuminators 8 are needed here to provide similar coverage to the previous embodiment. However, each one need only be half the size and half the power.

A third embodiment has the polarisation dependent reflector 10 divided into four sections that reflect radiation towards the target from four different directions. These four sections together form a pyramid shape that has been oriented such that the "top" of the pyramid now points broadly towards the target area 2. In this case, four illuminators 8 are required to ensure maximum coverage of the target area 2—one on the base, one overhead, and one at each side.

The skilled person will be aware that other embodiments within the scope of the invention may be envisaged, and thus the invention should not be limited to the embodiments as herein described.

The invention claimed is:

1. A chamber for viewing a target at millimetre wavelengths or thereabout, the chamber incorporating a first and second illumination means, the first illumination means being arranged to directly illuminate the target, and the second illumination means being arranged to illuminate the target via an apparatus such that the target is illuminated from a direction axial with that of an associated imager, wherein the apparatus comprises:
   a polarisation dependent reflector arranged to reflect millimetre wave or thereabouts radiation having a first polarisation state and pass said radiation having a second polarisation state; and
   an optical component for altering the polarisation state of radiation passing therethrough adapted such that radiation in the first polarisation state passing through the optical component towards the target, reflected therefrom and passing back through the optical component is transformed to the second polarisation state.

2. A chamber as claimed in claim 1 wherein the polarisation dependent reflector comprises a plurality of parallel conducting tracks.

3. A chamber as claimed in claim 1 wherein the polarisation dependent reflector is arranged to reflect radiation coming from a single general direction.

4. A chamber as claimed in claim 1 wherein the polarisation dependent reflector is divided into two or more parts, each arranged to reflect radiation coming from a different general direction towards the target.

5. A chamber as claimed in claim 1 wherein the optical component comprises a quarter wave plate.

6. A chamber as claimed in claim 5 wherein a meanderline is used as the quarter wave plate.

7. A method of illuminating a target in a chamber with millimetre radiation, or thereabouts, such that the target is illuminated from a plurality of different directions, one of which is axial with that of an associated imager, comprising the steps of:
   a) providing at least a first and second illumination source, and arranging the first illumination source to directly illuminate the target with said radiation;
   b) directing radiation from the second illumination source, positioned non-axially with respect to the imaging system, to a polarization dependent reflector and reflecting in an axial direction only radiation having a first polarisation state and passing radiation having a second polarisation state;
   c) processing the reflected radiation using an optical component, whereby the optical component changes the polarisation state of the radiation, and passing this processed radiation towards a target area;
   d) passing at least some of the radiation reflected from the target area back towards the optical component; and
   e) changing the polarisation of the radiation reflected from the target area to the second polarisation state such that it can pass through the polarisation dependent reflector.

8. A method as claimed in claim 7 wherein the polarisation dependent reflector comprises a plurality of parallel conducting tracks.

9. A method as claimed in claim 7 wherein the polarisation dependent reflector is arranged to reflect radiation coming from a single general direction.

10. A method as claimed in claims 7 wherein the polarisation dependent reflector is divided into two or more parts, each arranged to reflect radiation coming from a different general direction towards the target.

11. A method as claimed in claim 7 wherein the optical component comprises a quarter wave plate.

12. A method as claimed in claim 11 wherein a meanderline is used as the quarter wave plate.

* * * * *